(12) United States Patent
Hendrickson et al.

(10) Patent No.: US 11,747,204 B2
(45) Date of Patent: Sep. 5, 2023

(54) HIGH SENSITIVITY FREQUENCY-DOMAIN SPECTROSCOPY SYSTEM

(71) Applicant: The Johns Hopkins University, Baltimore, MD (US)

(72) Inventors: Scott M. Hendrickson, Baltimore, MD (US); Jeremiah J. Wathen, Annapolis, MD (US); Michael J. Fitch, Catonsville, MD (US); David W. Blodgett, Ellicott City, MD (US); Vincent R. Pagan, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/394,143

(22) Filed: Aug. 4, 2021

(65) Prior Publication Data
US 2022/0042849 A1 Feb. 10, 2022

Related U.S. Application Data

(60) Provisional application No. 63/062,454, filed on Aug. 7, 2020.

(51) Int. Cl.
*G01J 3/433* (2006.01)
*G02B 3/04* (2006.01)
(Continued)

(52) U.S. Cl.
CPC ........... *G01J 3/4338* (2013.01); *G01J 3/0208* (2013.01); *G01J 3/0264* (2013.01); *G01J 3/2823* (2013.01);
(Continued)

(58) Field of Classification Search
CPC ...... G01J 3/4338; G01J 3/0208; G01J 3/0264; G01J 3/2823; G01J 2003/4332; G02B 3/04
See application file for complete search history.

(56) References Cited

U.S. PATENT DOCUMENTS 8,705,046 B2 * 4/2014 Yun .................... G01B 9/02081
356/497
2005/0286049 A1 * 12/2005 Hagler .................. G01J 3/0294
356/328

(Continued)

*Primary Examiner* — Tarifur R Chowdhury
*Assistant Examiner* — Kemaya Nguyen
(74) *Attorney, Agent, or Firm* — Sung T. Kim

(57) ABSTRACT

A system includes first and second radiation sources, first and second detectors, a signal digitizer, a controller, and an analyzer. The first and second radiation sources generate respective first and second beams of radiation to irradiate a target. The first beam and second beams each include a first wavelength operated at a first modulation frequency and a second wavelength operated at a second modulation frequency. The first and second detectors each include a photo-sensitive element that generate first or second detection signals, a Faraday shielding enclosure, a signal amplifier, and a frequency mixer to frequency-adjust the first or second detection signals. The controller provides timing information to inform an activation scheme of the first and second radiation sources and corresponding radiation detection events at the first and second detectors. The analyzer analyzes the first and second detection signals and determines at least amplitude and phase information of the scattered radiation.

20 Claims, 7 Drawing Sheets

(51) Int. Cl.
*G01J 3/02* (2006.01)
*G01J 3/28* (2006.01)
(52) U.S. Cl.
CPC ........ *G02B 3/04* (2013.01); *G01J 2003/4332* (2013.01)

(56) References Cited

U.S. PATENT DOCUMENTS

2006/0061770 A1* 3/2006 Erskine .................... G01J 3/10
356/484
2014/0288349 A1* 9/2014 Seeber ................. A61N 5/1067
600/1

\* cited by examiner

HIGH SENSITIVITY FREQUENCY-DOMAIN SPECTROSCOPY SYSTEM

CROSS REFERENCE TO RELATED APPLICATIONS

This application claims benefit to U.S. Provisional Patent Application No. 63/062,454, filed on Aug. 7, 2020, which is incorporated by reference herein in its entirety.

TECHNICAL FIELD

The present disclosure relates to spectroscopy apparatuses, for example, a functional near-infrared spectroscopy system.

BACKGROUND

A functional near-infrared spectroscopy (fNIRS) system is a non-invasive tool to measure a time-varying absorption and scattering of light propagating through a target, for example, biological tissue. In functional neural imaging, fNIRS systems may be used to monitor the transmission of light in two or more spectral wavelength bins that straddle the isosbestic point of oxygenated vs. deoxygenated hemoglobin. Implementations of fNIRS span varying degrees of technical complexity, for example, continuous-wave (CW) fNIRS, frequency-domain (FD) fNIRS, and/or time-domain (TD) fNIRS. A user or system designer seeking a suitable fNIRS technique for a given application must consider the advantages and drawbacks of each technique.

SUMMARY

Accordingly, it is desirable to improve devices and functions used in fNIRS measurements, particularly those of FD-fNIRS, to deliver enhanced measurement capabilities without compromising the amount of information needed from a measurement (e.g., phase information), cost and complexity, form factor, and the like.

In some embodiments, a system comprises first and second radiation sources, first and second detectors, a signal digitizer, a controller, and an analyzer. The first and second radiation sources are configured to generate respective first and second beams of radiation to irradiate a target along respective first and second paths. The first and second beams each comprise a first wavelength at a first modulation frequency and a second wavelength at a second modulation frequency. The first and second detectors each comprise a photo-sensitive element, a Faraday shielding enclosure, a signal amplifier, and a frequency mixer. The photo-sensitive elements are configured to receive scattered radiation resulting from the first and second beams and to generate first or second detection signals respective to the first or second detectors. The signal amplifiers are configured to amplify the first or second detection signals. The frequency mixers are configured to frequency-adjust the first or second detection signals. The signal digitizer is configured to receive the first and second detection signals after the frequency-adjusting to generate a digitized signal. The controller is configured to provide timing information to at least the first and second radiation sources to inform an activation scheme of the first and second radiation sources and corresponding radiation detection events at the first and second detectors. The analyzer is configured to analyze the digitized signal and the timing information to determine at least amplitude and phase information of the scattered radiation.

In some embodiments, a non-transitory computer readable medium has instructions stored thereon, that, when executed on a computing device used in conjunction with a spectroscopy system, causes the computing device to perform operations. The operations comprise obtaining intensity information of a detection signal generated by a detector of the spectroscopy system. The operations further comprise generating a first vector comprising recording time of each element of the intensity information. The operations further comprise analyzing timing information based on a local oscillator of the spectroscopy system. The operations further comprise generating a second vector based on the timing information. The operations further comprise determining amplitude and phase of the detection signal based on a multiplication of the intensity information, the first vector, and the second vector.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
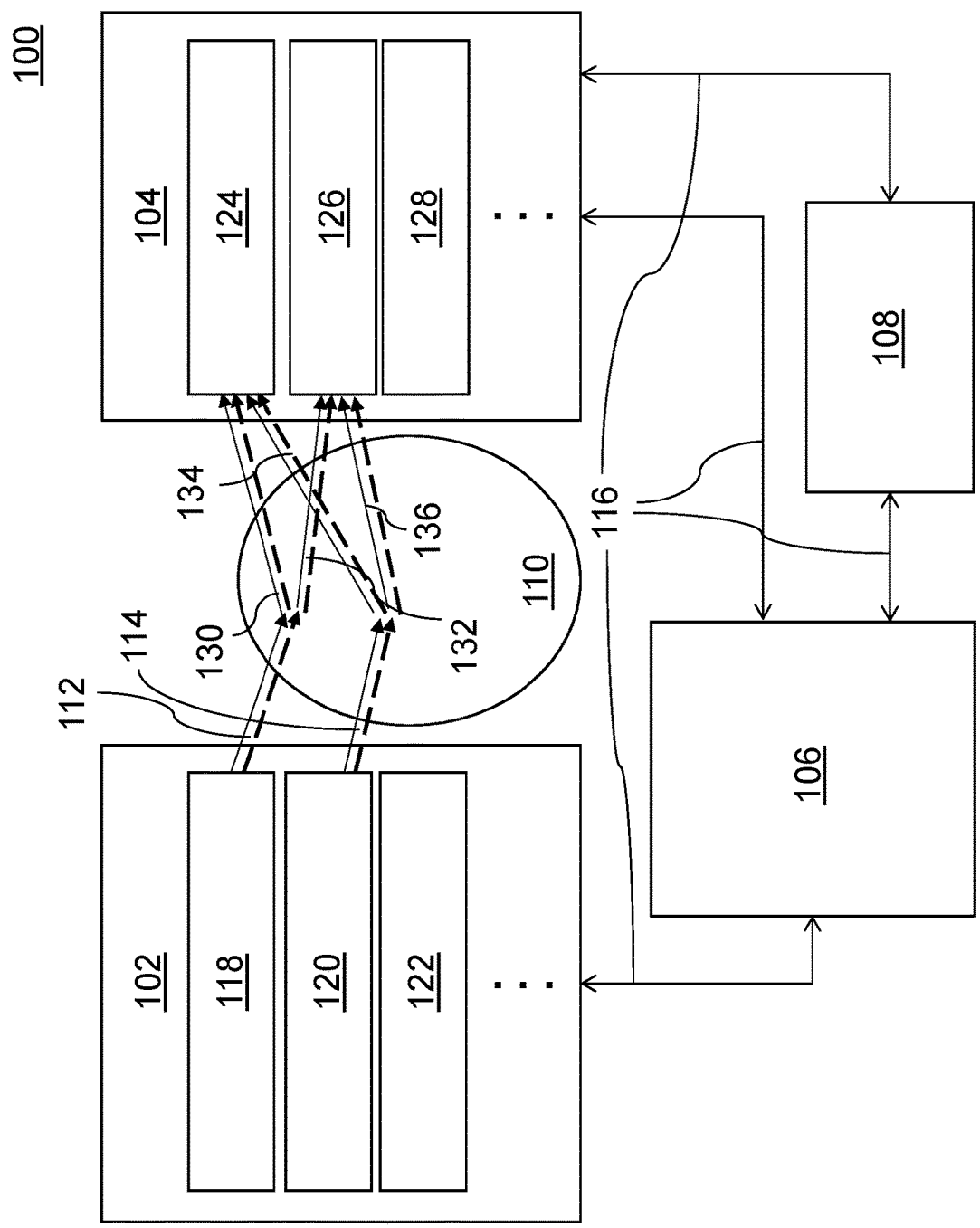
FIG. 1 shows a system for performing functional near-infrared spectroscopy, according to some embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5%±10%, ±15%, or ±20% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc. In the context of computer storage media, the term "non-transitory" may be used herein to describe all forms of computer readable media, with the sole exception being a transitory, propagating signal.

Overview

A functional near-infrared spectroscopy (fNIRS) system is a non-invasive tool to measure a time-varying absorption and scattering of light propagating through a target, for example, biological tissue. In some embodiment, in functional neural imaging, fNIRS systems may be used to monitor the transmission of light in two or more spectral wavelength bins (for example, 690 nm and 852 nm), which straddle the isosbestic point of oxygenated vs. deoxygenated hemoglobin near 808 nm. By measuring a differential transmittance among the spectral components, fNIRS may directly sense changes of the blood oxygenation in brain tissue, a proxy for metabolism. Therefore, fNIRS may provide an indication of neuronal firing within a sensing volume of the target sample. In this example, the time resolution of fNIRS for sensing brain activity may be limited by the hemodynamic response function (HRF), which may be hundreds of milliseconds or longer.

In some embodiments, in the visible to near-infrared spectrum the reduced scattering coefficient of brain, scalp and skull may be on the order of 1 inverse mm. Generally, light launched into tissue is rapidly diffused. As a result, the spatial resolution of fNIRS may be relatively coarse in comparison to some non-invasive techniques for functional brain imaging (e.g., on the order of 1 cubic cm). Additionally, strong scattering of photons may limit the effective penetration depth of fNIRS and prevent sensing of neuronal firings deep within the brain cortex. However, fNIRS systems may be made portable and at a relatively low price point compared to non-fNIRS alternatives. In some example, fNIRS is a relatively capable, yet inexpensive and portable platform, both for functional neural imaging in the clinical setting and for future commercial photonic devices for brain-computer interfacing (BCI).

In some embodiments, implementations of fNIRS may span varying degrees of technical complexity. In one approach, continuous-wave (CW) fNIRS, measurements are performed with light sources at constant intensity over the measurement period. CW-fNIRS systems measure the time-varying optical power returned to the photo-receiver to infer changes in absorption in the sensing volume. In this example, systems may use inexpensive slow photo-receivers and may omit electronics for modulating the optical sources or synchronizing the readout. In some CW-fNIRS systems, some intensity modulation of the light sources may be implemented to circumvent 1/f noise and background light. However, the modulation is slow enough such that the overall measurement is still a CW technique within a measurement period. CW-fNIRS is effective when viewed in the context of its simplicity. In some embodiments, because CW-fNIRS is a magnitude-only measurement, it is insensitive to any information about the underlying neural activity encoded in the time-of-flight of photons through the tissue.

In some embodiments, to extend the capabilities of fNIRS, illumination sources may be modulated to allow for phase-sensitive detection, for example, in the case of frequency-domain (FD) fNIRS. In this example, the amplitude of each illumination source may be modulated (e.g., using a radio frequency (RF) signal, typically a sinusoidal waveform). For example, at the detection stage, the RF carrier wave is demodulated from the photo-current generated by a photo-receiver. Demodulation is achieved, for example, using analog demodulation hardware prior to digitization or digital signal processing after digitization, or both. FD-fNIRS therefore may detect both the amplitude and phase of the RF signal encoded onto the photon density wave, which propagates through the target sample. In some embodiment, FD-fNIRS may have increased cost and complexity of building a multi-channel radio transceiver to modulate and demodulate the optical links.

In some embodiments, a FD-fNIRS measurement of a signal's amplitude is analogous to the magnitude-only measurement of CW-fNIRS. In an example, the phase degree of freedom in a FD-fNIRS measurement, which is not accessible using CW-fNIRS, represents a measurement of the mean time of flight of the ensemble of photons in the photon density wave. The modulation frequency is an adjustable parameter of FD-fNIRS. For frequencies below 100 MHz, traditional linear-regime photo-detectors that possess low noise equivalent power (NEP) and large collection area are available commercially off-the-shelf (COTS). In some embodiments, solutions of photon transport in diffusive media suggest there is a relatively high optimum frequency, somewhere in the range 200 MHz to 1.2 GHz, to optimize sensitivity to both phase and amplitude simultaneously. In one example, to access this regime, the bandwidth of a linear-mode detector is increased at the cost of degraded noise performance and/or reduced collection area. Therefore, for a given source-detector separation, the optical link budget of a high-frequency FD-fNIRS system may be worse than that of an otherwise identical CW-fNIRS system.

In some embodiments, the ability to measure both amplitude and phase allows FD-fNIRS to independently determine reduced scattering and absorption coefficients of the sensing volume. The measurement of the phase signal may also allow sensing of changes deeper in the cortical tissue, though in practice, the degraded signal-to-noise (SNR) performance of traditional photo-receivers operating above 100 MHz tends to cancel this effect. The additional information provided by the phase signal may also increase the resolution of the recorded dataset and exhibit improved robustness to motion artifacts. In some embodiments, improving FD-fNIRS technology is important for achieving high-spatial resolution functional imaging within a low-cost and portable form factor.

In some embodiments, an alternative to FD-fNIRS is time-domain (TD) fNIRS, which is more complicated in many respects. For example, in TD-fNIRS each illumination source periodically emits a short delta-function-like pulse. A Geiger-mode photo-receiver may be used in conjunction with time-correlated, single-photon-counting electronics to resolve the shape of the distribution-of-times-of-flight (DTOFs) of photons in the time domain (non-limiting examples of Geiger-mode photo-receivers include: a single-photon avalanche detector (SPAD), a photo-multiplier tube (PMT), a hybrid avalanche photo-multiplier (PMA hybrid), a SiPM, a SPAD camera, or the like). In some examples, TD-fNIRS allows for sorting the detected photons into time bins to distinguish early photons from late ones—photons that have travelled not very far in the target sample compared to photons that have penetrated deep into the tissue. This may provide more complete information than FD-fNIRS, whose phase signal is related to the Fourier Transform of the temporal point spread function of the target sample under test and is most sensitive to the mean time of flight of the ensemble of photons. For example, the phase signal of FD-fNIRS measures the first moment of the DTOF, whereas TD-fNIRS measures the whole shape of the DTOF. In some embodiments, investigations may determine whether the additional information provided by TD-fNIRS actually leads to an improvement in decoding neural activity as compared to FD-fNIRS.

In some embodiments, TD-fNIRS may have increased cost and complexity of the components of the system. For example, illumination sources may operate at picosecond speeds and high-quality (i.e., high cost) Geiger-mode detectors with excellent impulse response characteristics are often needed along with high-precision photon-counting electronics (i.e., high complexity). In some examples the quality and availability of such components is improving, and their costs are decreasing.

Example Spectroscopy System

Embodiments of the present disclosure are directed to spectroscopy systems. Embodiments described herein may be used to, for example, reduce cost, size, and/or complexity of construction of a spectroscopy system while enhancing noise reduction, SNR, dynamic range, and/or other performance quantifiers (or at least minimizing adverse impact to performance as a result of the reduction in cost, size, and/or complexity).

FIG. 1 shows a system 100, according to some embodiments. In some embodiments, system 100 comprises an illumination system 102, a detection system 104, a controller 106, and an analyzer 108. System 100 may be used to perform, for example, near-infrared spectroscopy (e.g., fNIRS) on a target 110.

In some embodiments, illumination system 102 may generate beams of radiation 112 and 114 (e.g., first and second beams of radiation) to irradiate target 110. Beam of radiation 112 may propagate along a first path toward target 110. Beam of radiation 114 may propagate along a second path toward target 110. The first and second paths may be different from one another, such that the radiation from illumination system 102 may be scattered by different portions of target 110.

Beam of radiation 112 may comprise two or more photon wavelengths. For example, a first wavelength may be 690 nm and a second wavelength may be 852 nm. Beam of radiation 114 may comprise two or more photon wavelengths. The wavelengths of beam of radiation 114 may be the same as the wavelengths of beam of radiation 112.

In some embodiments, any suitable wavelength(s) may be chosen by one skilled in the art or a user (if the system has selectable wavelengths) that is optimal for a given application (e.g., wavelengths chosen from microwave, NIR, visible, or the like). For example, the use of 690 nm 852 nm wavelengths may be suitable if system 100 is to be used in fNIRS applications on brain tissue. For other types of targets 110 (e.g., a non-biological sample), wavelengths may be chosen based on the material of target 110.

In some embodiments, beam of radiation 112 may be modulated at one or more frequencies. For example, a portion of beam of radiation 112 comprising a first wavelength may be modulated at a first frequency. A portion of beam of radiation 112 that comprises the second wavelength may be modulated at a second frequency. The wavelength/frequency pairings are provided as non-limiting examples. One skilled in the art will appreciate that other numbers of wavelengths, modulation frequencies, and combinations thereof are envisaged for embodiments described herein. For example, wavelengths and/or frequencies may be chosen by one skilled in the art or a user of system 100 (in so far as system 100 allows the parameters to be selectable) to optimize a response from target 110, achieve a desired noise characteristic, achieve a desired cost of construction, or the like.

In some embodiments, color-sensitive photon detectors may be used in detection system 104 to discriminate between the first and second wavelengths. However, it is envisaged that a 'black and white' or 'color-blind' detection element may be used as well.

In some embodiments, the modulation frequencies may function as 'labels' for the different photon wavelengths, such that when radiation is detected at a detector, the analysis on the detection side may employ spectrometric analysis to discriminate between the first and second wavelengths. In this scenario, a simple 'black and white' or 'color-blind' detector system may be used (e.g., a detector that outputs a simple voltage or current based on the received illumination intensity from all colors aggregated). Such detectors may provide smaller footprint, simpler construction, lower cost, less noise, more sensitivity, more dynamic range, faster response times, faster switching speeds, and/or other enhancements compared to color-sensitive detectors.

In some embodiments, the modulation frequencies of beams of radiation 112 and 114 may be in the RF regime. In the non-limiting context of fNIRS and measurements on biological samples, radio frequencies may provide optimum response from target 110. In this manner, capabilities of system 100 may be enhanced (e.g., increased SNR, increased dynamic range, and the like). For other types of target 110 (e.g., a non-biological sample), modulation frequencies may be chosen based on the material of target 110 (e.g., a frequency that produces a peak response from target 110). The radio frequencies may be in a range of approximately 70 MHz to 500 MHz, 100 MHz to 2 GHz, 150 MHz to 1.5 GHz, or 200 MHz to 1.2 GHz—to name a few non-limiting examples. Another non-limiting example may be frequencies in the vicinity of 211 MHz, which has particular significance in applications of fNIRS measurements on biological tissue.

In some embodiments, illumination and detection operations of system 100 may be governed by communicating timing information to parts of system 100. This is useful for controlling timings of multiple illumination sources and detectors so as to perform sequenced and/or parallel detection while reducing noise, interference, and cross-talk between sensitive parts of system 100. Controller 106 may generate timing information. Controller 106 may send the timing information via one or more communication path(s) 116 to illumination system 102, detection system 104, and/or analyzer 108 to inform and control an activation sequence of radiation sources. Communication paths may be implemented via suitable interface(s), for example, a serial peripheral interface (SPI) and/or a universal serial bus (USB). The timing information may be used as identification or label that allows detection system 104 and/or analyzer 108 to determine or rule out which radiation sources are on or off as photons are received at detection system 104. Other methods of labeling include generating beams of radiation with different frequencies, wavelengths, intensity, and/or other identifiable parameter.

In some embodiments, illumination system 102 may comprise two or more radiation sources. For example, illumination system 102 may comprise radiation source 118 (e.g., a first radiation source), radiation source 120 (e.g., a second radiation source), and/or one or more additional radiation sources 122. Radiation source 118 may be tasked with generating beam of radiation 112. Radiation source 120 may be tasked with generating beam of radiation 114. One or more additional radiation sources 122 may be tasked with generating one or more additional beams of radiation (e.g., along one or more additional beam paths so as to probe more of the volume of target 110). Radiation sources 118, 120, and/or 122 may be identical or similar to one another in construction and function. In order to deliver beams of radiation 112 and 114 (as well as additional beams of radiation from one or more radiation source 122), the radiation sources may comprise optical fibers (e.g., multimode fibers) to guide the radiation along specific paths through target 110. By arranging a plurality of radiation sources and a plurality of optical fibers along different paths, a large volume of target 110 may be probed using system 100.

In some embodiments, radiation sources 118, 120, and 122 may be activated (e.g., outputting radiation) simultaneously, one at a time (e.g., in a sequence), a subset simultaneously, simultaneous subsets in sequence, or any suitable permutation. The timing information from controller 106 may be received by illumination system 102 and radiation sources 118, 120, and 122 to control the activation. For faster measurements, more than one radiation source may be activated at a time. However, if illumination system 102 has many illumination sources (e.g., 32 illumination sources), it may be detrimental to activate all radiation sources simultaneously (e.g., doing so may saturate detection system 104, introduce higher noise, or the like). Then, in some embodiments, activating one radiation source at a time in sequence may be more suitable.

The terms "time encoding," "time encoded," "timing sequence," or the like, may be used to refer to activation in sequence of radiation sources (e.g., one by one or subsets of radiation sources in sequence). For example, the timing information provided by controller 106 provides time encoding to illumination system 102 to control the order in which radiation sources 118, 120, and 122 are activated. By using time encoding, system 100 may help reduce noise and also avoid saturation of detection system 104. Time encoding may be especially effective at mitigating shot noise.

In some embodiments, activating radiation sources 118, 120, and 122 is not limited to on/off binary states. The timing information may comprise information for activating radiation sources 118, 120, and 122 to a partial intensity state (e.g., 25%, 50%, 75%, or 100% of full output intensity). Furthermore, the partial intensity state(s) may be modulated according to a discernable pattern (e.g., amplitude modulation). In amplitude modulation, a carrier signal (e.g., a sinusoidal modulation at a lower frequency) may be imposed on the modulated illumination signal (recalling that each of beam of radiation 112 and 114 may already have labeling frequencies, for example, radio frequencies). Different carrier signals may be imposed on the different beams of radiation. In the detection side, scattered illumination intensity received by detection system 104 may be demodulated to identify the intensity and/or phase contributions that correspond to the radiation source they originated from. In this manner, amplitude modulation allows labeling of different beams of radiation using partial intensity states, as opposed to using on/off binary time encoding. By using amplitude modulation, system 100 may help reduce measurement time by allowing simultaneous activation of radiation sources and subsequent discrimination of illumination intensities and phases based on detected carrier signals.

In some embodiments, both amplitude modulation and time encoding may be used together in system 100.

In some embodiments, detection system 104 may comprise two or more detectors. For example, detection system 104 may comprise detector 124 (e.g., a first detector), detector 126 (e.g., a second detector), and/or one or more additional detectors 128. Detectors 124, 126, and/or 128 may be identical or similar to one another in construction and function. Detectors 124, 126, and/or 128 may receive radiation scattered by target 110. The received scattered radiation may comprise a portion 130 (e.g., a first portion) and portion 132 (e.g., a second portion) from beam of radiation 112 that has been scattered by target 110. The received scattered radiation may further comprise a portion 134 (e.g., a first portion) and portion 136 (e.g., a second portion) from beam of radiation 114 that has been scattered by target 110. In other words, detectors 124, 126, and/or 128 may receive scattered radiation resulting from beams of radiation 112 and 114, as well as beams of radiation from any additional radiation sources. While only two beams of radiation 112 and 114 and resulting scattering are expressly shown in FIG. 1, one skilled in the art will appreciate that additional radiation is not shown for drawing clarity and that the additional radiation and scattering would be readily apparent based on the descriptions herein in reference to beams of radiation 112 and 114.

For example, in some embodiments, 32 radiation sources and 32 detectors may be used. This is a non-limiting example and it should be appreciated that M radiation sources and N detectors may be used, where the positive integers M and N are possibly non-equal. The outputs/inputs of the optical fibers corresponding to each of the 32 radiation sources and 32 detectors may be distributed so as to illuminate (or receive radiation from) target 110 at different locations and angles (e.g., different paths). In this example, each of the 32 radiation sources may generate 32 different identifiable beams of radiation, while the 32 detectors may receive portions of radiation from each beam that was scattered by the target. For a given beam of radiation, some detectors may receive more scattered intensity than other detectors due to scattering behavior (e.g., attenuation based on distance traveled in target 110, scattering angle, and/or the like). In some embodiments, the ability to detect scattered radiation at detectors far away from a main scattering path is influenced by the amount of noise present in system 100. Some embodiments herein are directed to reducing this noise so as to be able to distinguish a useful signal from detectors spaced as far as possible from the radiation source(s). Furthermore, more or fewer radiation sources and detectors may be used according to embodiments herein.

Figure 2:
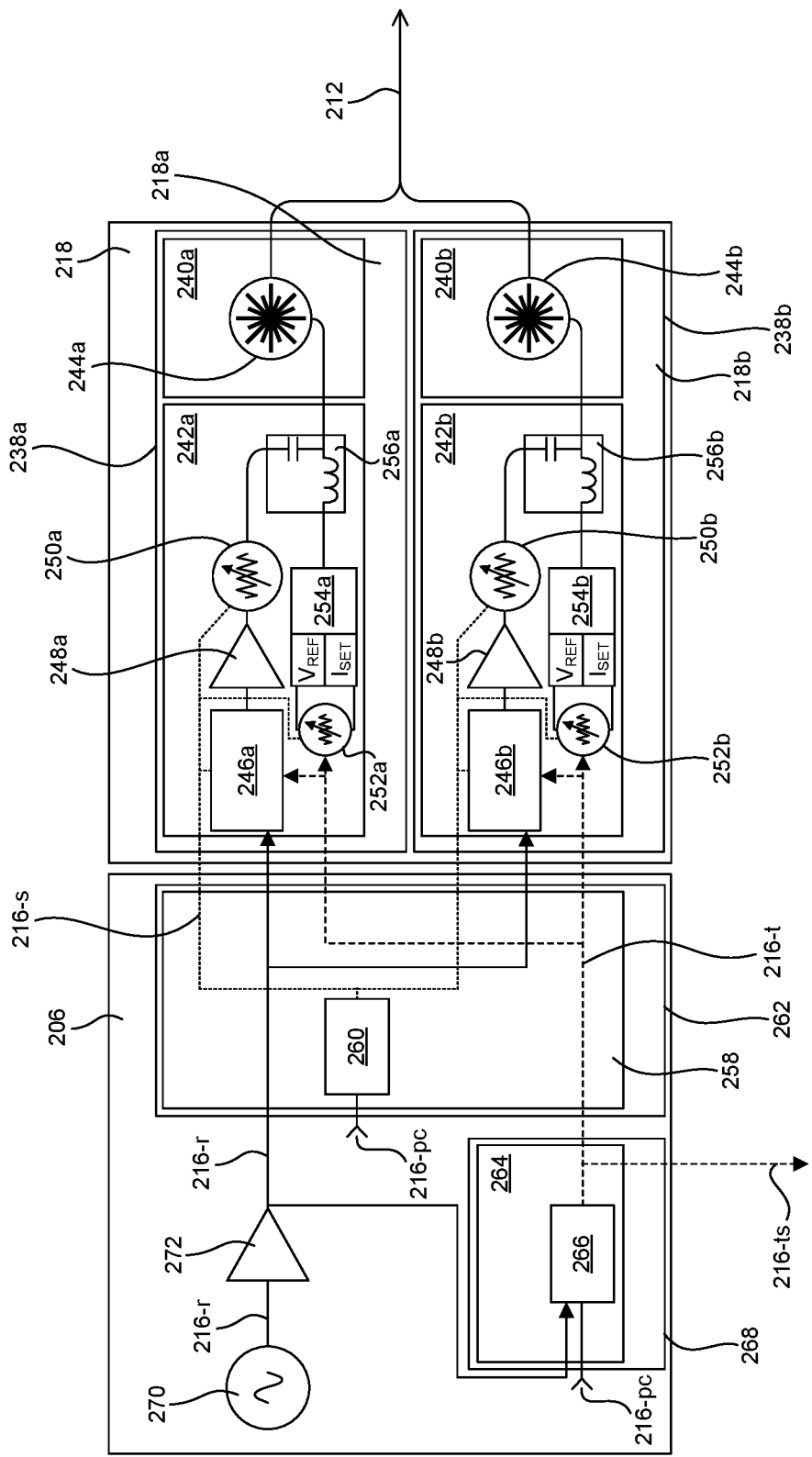
FIG. 2 shows a radiation source, according to some embodiments.

FIG. 2 shows radiation source 218 (e.g., a first radiation source), according to some embodiments. In some embodiments, radiation source 218 may represent another view of radiation sources 118, 120, and/or 122 (FIG. 1), while highlighting additional details. Unless otherwise noted, structures and functions described previously for elements of FIG. 1 can also apply to similarly numbered elements of FIG. 2 (e.g., reference numbers sharing the two right-most numeric digits). Consequently, certain structures and functions of elements of FIG. 2 should be apparent from descriptions of corresponding elements of FIG. 1. It should be appreciated that structures and functions of other radiation sources disclosed herein may be identical or similar to radiation source 218.

In some embodiments, radiation source 218 may comprise radiation source subsystems 218a and 218b (e.g., first and second radiation source subsystems of the first radiation source). Radiation source subsystem 218a may comprise a shielding enclosure 238a (e.g., a Faraday enclosure), a circuit board 240a (e.g., a laser carrier board), a circuit board 242a (e.g., a daughter board), a light-emitting element 244a (e.g., a TO can laser diode), and a collection of electronic circuit elements—for example, a phase-locking element 246a (e.g., a fractional-N phase-locked loop), an amplifier 248a (e.g., an op amp, IF amp, or the like), a variable attenuator 250a, a potentiometer 252a, an illumination driver 254a, and/or a bias tee 256a. It should be appreciated that descriptions herein for the above-noted parts of radiation source subsystem 218a may be iterated for radiation source subsystem 218b, shielding enclosure 238b, circuit boards 240b and 242b, light emitting element 244b (e.g., a TO can laser diode), phase-locking element 246b, amplifier 248b, variable attenuator 250b, potentiometer 252b, illumination driver 254b, and/or bias tee 256b.

In some embodiments, radiation source 218 functions in conjunction with a controller 206. Controller 206 may comprise a circuit board 258 (e.g., a motherboard) with a controller element 260 (e.g., a microcontroller) and a shielding enclosure 262, a circuit board 264 (e.g., a grandmother board) with a controller element 266 (e.g., a microcontroller) and a shielding enclosure 268, reference oscillator (or reference clock) 270 (e.g., low-phase-noise crystal oscillator), and/or an amplifier 272 (e.g., a distribution amplifier). The input/output arrangement of the electronic elements of radiation source 218 and controller 206 may be as shown in FIG. 2.

In some embodiments, structures and functions of radiation source 218 may be used for generating a beam of radiation 212 having multiple narrowband wavelengths and low noise modulation. Beam of radiation 212 may be output via, for example, a multimode fiber. Radiation source 218 may generate, for example, two wavelengths, with light-emitting element 244a generating photons of the first wavelength and light emitting element 244b generating photons of the second wavelength. The first and second wavelengths may be narrowband (e.g., narrow bandwidths centered around peak wavelengths). The first and second wavelengths may be, for example, approximately 690 nm and 852 nm, respectively.

In some embodiments, structures and functions of radiation source 218 and controller 206 are designed and/or arranged to reduce interference and/or cross-talk that may adversely impact clear labeling of the different portions of beam of radiation 212. For example, shielding enclosures disclosed herein may be for shielding interference in a specific frequency range of operation (e.g., a RF shielding enclosure). The electronics on circuit boards 240a and 242a may be housed in shielding enclosure 238a so as to prevent interference and/or cross-talk with the AC signals being used in radiation source subsystem 218b and controller 206. Juxtaposed, the electronics on circuit boards 240b and 242b may be housed in shielding enclosure 238b so as to prevent interference and/or cross-talk with the AC signals being used in radiation source subsystem 218a and controller 206. Similarly, shielding enclosures 262 and 268 house respective circuit boards for mitigating leakage of AC signals that may adversely impact noise characteristics of radiation source subsystems 218a and 218b. Furthermore, the separation of circuit boards 240a, 242a, 240b, 242b, 258, and/or 264 (and their corresponding shielding enclosures) may allow for modularity of hardware parts and may improve isolation of interfering signals. In some embodiments, the modularity allows for targeted serviceability of the system (e.g., replacing a modular portion of the system as opposed to dismantling and rebuilding large parts of the system).

The modulation of the two wavelengths may be based on a reference clock-reference oscillator 270. Reference oscillator 270 may be used to synchronize oscillators in system 100 (FIG. 1). Reference oscillator 270 may generate a reference signal 216-r, providing a reference phase and frequency to system 100 (FIG. 1). The reference frequency may be, for example, 10 MHz (e.g., a frequency that works with phase locking-element 246a, and/or phase-locking element 246b). Reference signal 216-r may pass through amplifier 272 (e.g., a distribution amplifier), which amplifies and distributes reference signal 216-r to various parts of the system including components of the example receiver subsystem depicted in FIG. 3. Reference signal 216-r may be distributed to, for example, controller element 266, phase locking-element 246a, and/or phase-locking element 246b.

In some embodiments, phase-locking element 246a may generate a first modulation signal based on the received reference signal 216-r. The first modulation signal may modulate the amplitude of the radiation having the first wavelength at a first modulation frequency. The first modulation frequency may be based on the frequency of phase-locking element 346 ($f_{LO}$, described later in reference to FIG. 3) modified by a first offset ($\delta_1$) (e.g., $f_{LO}+\delta_1$). The first modulation frequency may be an RF frequency in the ranges previously described in reference to FIG. 1. For example, the first frequency may be in the vicinity of 211 MHz. User-selected settings 216-s may be written to the registers of phase-locking element 246a to control phase-locking element 246a to emit a desired frequency. The output of phase-locking element 246a may be approximately +0 dBm before amplification. Then, amplifier 248a may amplify the first modulation signal output by phase-locking element 246a to provide approximately a +20 dB gain (non-limiting example).

In some embodiments, variable attenuator 250a may receive the amplified first modulation signal. Variable attenuator 250a may be a digital step attenuator. In embodiments in which amplitude modulation is used, variable attenuator 250a may adjust a peak current of the first modulation signal to achieve complete amplitude modulation. In embodiments in which amplitude modulation is not used, variable attenuator 250a may be omitted or be set to a constant value. In embodiments in which time encoding is used, phase-locking element 246a and/or potentiometer 252a may include mute pins to receive timing information 216-t as input. The timing information 216-t can be used to de-energize light emitting element 244a for a period of time specified by the timing information 216-t.

In some embodiments, bias tee 256a may receive the amplified first modulation signal to provide the modulation to the illumination-driving signal coming from illumination driver 254a. Illumination driver 254a may have voltage reference ($V_{ref}$) and current set ($I_{set}$) inputs to control the illumination-driving signal (DC before modulation) that provides power to light-emitting element 244a. Potentiometer 252a may receive the timing information 216-t as input to shut down the DC illumination-driving signal for a period of time specified by the timing information 216-t.

In some embodiments, phase-locking element 246b may generate a second modulation signal based on the received reference signal 216-r. The functional description of the electronic components of radiation source subsystem 218b may be similar as described above with respect to electronic components of radiation source subsystem 218a, the difference being that the second modulation signal may modulate the radiation having the second wavelength at a second modulation frequency (e.g., $f_{LO}+\delta_2$, where $\delta_2$ is a second offset). The second modulation frequency may be an RF frequency in the ranges described above. The first and second modulation frequencies may be different from one another so as to label respective wavelength portions of beam of radiation 212. For example, the first and second modulation frequencies may be different from one another by at least 50 kHz or more, 100 kHz or more, 200 kHz or more, or 500 kHz or more, to name a few examples. In a specific example, the first and second modulation frequencies may be chosen such that $f_{LO}+\delta_1$ and $f_{LO}+\delta_2$ exist in the range $f_{LO}+/-96$ kHz. The first and second modulation frequencies may be independently controllable.

In some embodiments, in-series ferrite beads and/or shunt capacitors (not shown) may be implemented on any of the electrical inputs or outputs to minimize interference and/or cross-talk. Additionally, or optionally, reference oscillator 270 may be further isolated using a transformer and/or filtered using a low-pass filter (e.g., a lumped LC low-pass filter).

In some embodiments, circuit board 258 (e.g., motherboard) and controller element 260 may act as an intermediary between control software running on a PC and the circuits on circuit boards 242a and 242b via communication paths 216-pc. Circuit board 258 may be one of a plurality of motherboards. In other words, it can be scalable, just as other parts of system 100 (FIG. 1) can be scalable (e.g., 32 radiation sources, 32 detectors, or the like). For example, a system comprising 32 radiation sources, each with two wavelength subsystems, may be serviced by four of circuit boards 258 (motherboards), each motherboard being capable of servicing 8 radiation sources. A unique hardware ID may be assigned to each motherboard by, for example, configuring a surface-mounted 4-pin dip switch, to facilitate unambiguous addressing of each circuit board in the 32×2 radiation source subsystems.

In some embodiments, inputs to circuit board 258 may be, for example, AC mains power (not shown), a universal serial bus (USB) connection from the controlling PC (e.g., communication path 216-pc), a coaxial pass-through carrying reference signal 216-r, and/or a pass-through (e.g., a 25-pin D-sub connector) for carrying timing information 216-t. Timing information may be, for example, a 16 TTL time-encoding signal, which originates from controller element 266 (i.e., the microcontroller on the grandmother board 264) and is fanned-out to each radiation source via conductors on circuit board(s) 258 (motherboards). The outputs from the circuit board 258 may be, for example, a connector for sending user-selected settings 216-s (e.g., 15-pin D-sub connectors, one connector for each radiation source subsystem). Wired connections may use shielded cables. This cabling arrangement allows multiple radiation sources to be placed at arbitrary locations in an equipment rack.

In some embodiments, power from the AC mains (e.g., 120V/60 Hz) may be supplied to each motherboard assembly using a shielded, filtered power cord, which enters the enclosure of the motherboard through a shielded cable gland. A standalone AC/DC converter inside the enclosure may convert the power to DC (e.g., +5 VDC), which may be regulated on the motherboard and sent to each radiation source subsystem.

In some embodiments, controller element 260 may be connected to circuit board 258 via an Arduino header. Commands from the controlling PC may be sent to controller element 260, for example, via a USB-to-UART (universal asynchronous receiver transmitter) bridge. A firmware running on controller element 260 may interpret the commands and send corresponding payload bytes to the individually addressed end-points at each of circuit boards 242a and 242b.

In some embodiments, on circuit board 258 a surface-mounted RF splitter may split reference signal 216-r (e.g., 10-MHz clock) evenly among the outputs. Reference signal 216-r to each circuit board 242a and 242b may be transformer-isolated and converted to a balanced signal just before exiting the circuit board 258. Other conductors leading to each of circuit boards 242a and 242b may be filtered using in-series ferrite beads and shunt capacitors disposed proximal to each exterior connection.

In some embodiments, circuit board 264 (e.g., grandmother board) may generate transistor-transistor logic (TTL) waveforms, one for each daughter board (e.g., 64 TTL for a 32 radiation-source implementation), to implement the time-encoding protocol. Controller element 266 on circuit board 264 may connect to a pin header on circuit board 264, inside shielding enclosure 268 (e.g., a dedicated Faraday enclosure). The input to the grandmother assembly may be a universal serial bus (USB) pass through, which may provide power and a programming interface to controller element 266.

In some embodiments, controller element 266 may have sufficient general purpose input/output (GPIO) to provide a dedicated time-encoding signal (each on a dedicated conductor) to each of circuit boards 242a and 242b. Timing information 216-t may be the time-encoding signal. Controller element 266 may have firmware to generate a suitable pattern of TTL signals. The TTL signals may be routed out of shielding enclosure 268 via, for example, 25-pin D-sub connectors, one for each motherboard. A motherboard (e.g., circuit board 258) may connect to the grandmother board (e.g., via a shielded 25-pin serial cable assembly). The motherboards may then fan the TTL time-encoding signals to each of circuit boards found in the radiation source subsystems (e.g., circuit boards 242a and 242b).

In some embodiments, controller element 266 may also emit an additional TTL signal (e.g., a 65th TTL signal), a sync signal 216-ts. Sync signal 216-ts provides information about 216-t such as, for example, the pulse repetition frequency, duty cycle and phase of the TTL signals in 216-t. Sync signal 216-ts may exit circuit board 264 via, for example, a balanced 3.5-mm TRS (tip, ring, and sleeve) audio jack. Sync signal 216-ts may be split as needed and carried to a designated analog input channel of each signal digitizer (e.g., audio digitizers) in a digitizer assembly (described later in reference to FIG. 3) of the detector-side devices using shielded audio cables. A rising edge of the sync may be coincident in time with the beginning of each repetition of the time-encoding pattern. In post processing, the sync signal 216-ts may be used to time-register the digital signal processing used for demodulation of the signals. The demodulation scheme may be, for example, in-phase/quadrature-phase (I/Q) demodulation. It is also useful to allow for troubleshooting of buffer overrun and/or underrun, which sometimes occur with commercially available audio digitizers.

While optical fibers were not shown in FIG. 1 or 2 for routing beams of radiation 112 or 212, those skilled in the art will appreciate that, in some embodiments independently operated light emitting elements 244a and 244b may be coupled to a pair of multimode optical fibers, which are coupled to a single optical fiber-bundle so as to guide radiation of two wavelengths along a common path.

While FIG. 2 illustrated an exemplary arrangement with two radiation source subsystems 218a and 218b for generating two wavelengths, those skilled in the art will appreciate that additional wavelengths may be implemented by scaling up radiation source 218 and/or controller 206. For example, additional radiation source subsystems 218n may be implemented, where n indicates additional iterations of radiation source subsystem 218a or 218b.

Figure 3:
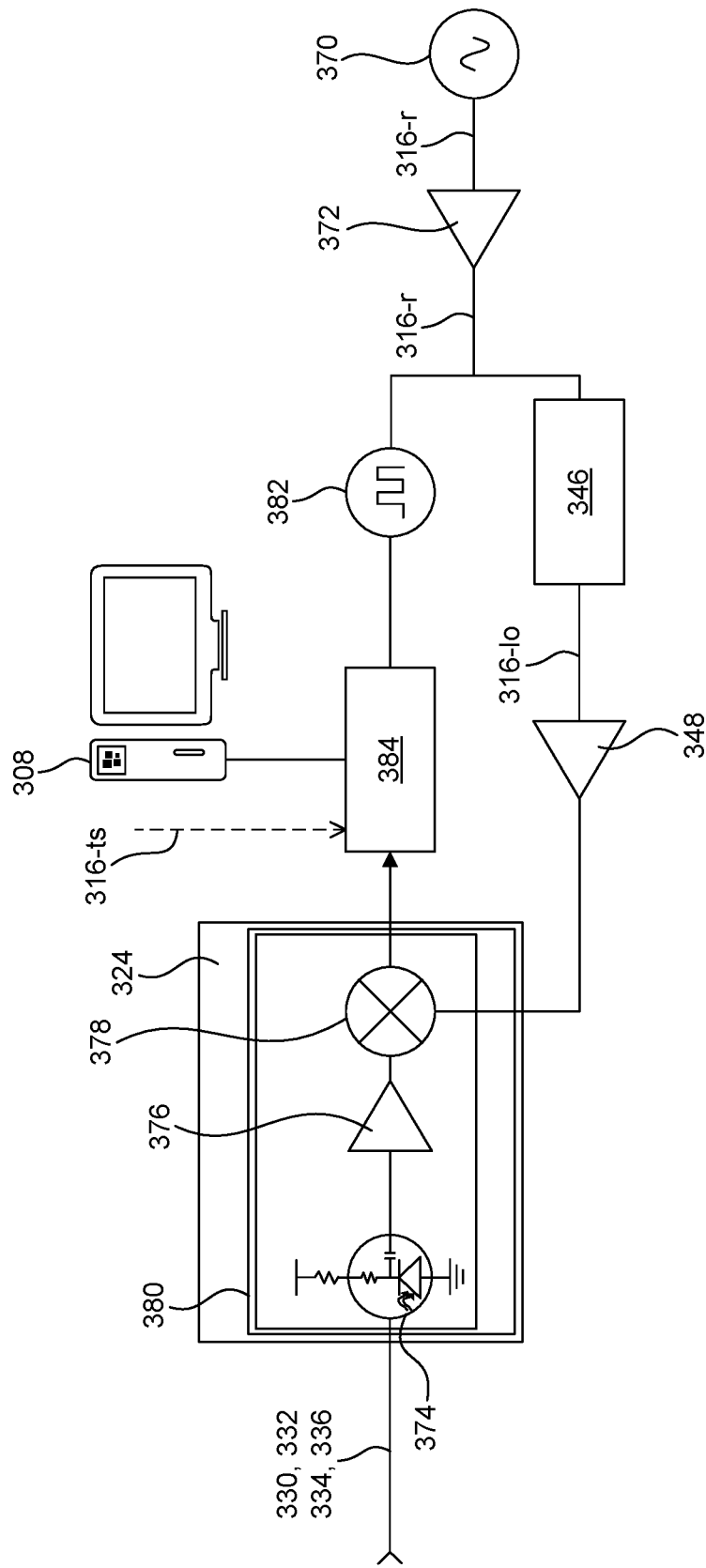
FIGS. 3 and 4 show detectors, according to some embodiments.

FIG. 3 shows a detector 324, according to some embodiments. In some embodiments, detector 324 may represent another view of detectors 124, 126, and/or 128 (FIG. 1), while highlighting additional details (as well as some elements of FIG. 2, for example controller elements). Unless otherwise noted, structures and functions described previously for elements of FIGS. 1 and 2 can also apply to similarly numbered elements of FIG. 3 (e.g., reference numbers sharing the two right-most numeric digits). Consequently, certain structures and functions of elements of FIG. 3 should be apparent from descriptions of corresponding elements of FIGS. 1 and 2, and thus some elements may not be reintroduced for brevity. Furthermore, the scalability described in reference to FIGS. 1 and 2 will not be repeated again for brevity, but it should be appreciated that scalability applies to elements of FIG. 3 in a similar manner.

In some embodiments, detector 324 may comprise a photo-sensitive element 374, an amplifier 376, and a frequency mixer 378 (e.g., a double balanced mixer). Photo-sensitive element 374, amplifier 376, and frequency mixer 378 may be disposed on a circuit board, all of which may be enclosed in a shielding enclosure 380. Other hardware may interact with detector 324, for example, a reference oscillator 370, amplifiers 348 and 372, a local oscillator 346 (e.g., a phase-locking element), a function generator 382, and/or signal digitizer 384 (e.g., an audio digitizer). Some elements, such as reference oscillator 370, amplifier 372, and timing information have already been described in the context of a controller (e.g., controller 206 (FIG. 2)) for controlling various aspects of a system used for spectroscopy (e.g., system 100 (FIG. 1)).

In some embodiments, photo-sensitive element 374 may be a Geiger-mode photo receiver, for example, a single-photon avalanche detector (SPAD), a photo-multiplier tube (PMT), a hybrid avalanche photo-multiplier (PMA hybrid), a silicon photo-multiplier (SiPM), a SPAD camera, or the like. Photo-sensitive element 374 may have a suitably fast response time so as to be able to keep up with the first and second modulation frequencies of beams of radiation 112, 114, and/or 212 (FIGS. 1 and 2), for example, radio-frequencies. Radiation scattered by target 110 (FIG. 1) may be incident on an input of an optical fiber (e.g., a multimode optical fiber) that guides the scattered radiation so that photo-sensitive element 374 may receive portions 330, 332, 334, and/or 336 of the scattered radiation (see e.g., portions 130, 132, 134, and 136 of FIG. 1) that has made it to the optical fiber. Amplifier 376 may comprise, for example, a RF amplifier chain.

In some embodiments, the optical fiber(s) may be a bundle of high-NA (numerical aperture) optical fibers. The bundle of high-NA fibers may have a larger étendu than what is possible with a single MM fiber. The bundle of high-NA fibers may allow even more collection of light from target 110, to maximize SNR.

In some embodiments, power from the AC mains (not shown) may be provided via a shielded AC power cord, which may pass through the bulkhead of shielding enclosure 380 via an interference-tight cable gland. An AC/DC converter (not shown) may be mounted inside the enclosure to convert the AC mains power to DC (e.g., +/−15 VDC). On the circuit board, the DC power may be filtered, then converted again (e.g., +/−5 VDC and/or +/−2.5 VDC) using, for example, linear voltage regulators.

In some embodiments, photo-sensitive element 374 may generate a detection signal (e.g., a first detection signal) based on the received portions 330, 332, 334, and/or 336 of the scattered radiation. As portions 330, 332, 334, and/or 336 of the scattered radiation are "labeled" using modulation frequencies set by radiation sources 118, 120, 122, and/or 218 (FIGS. 1 and 2) and timing information (e.g., amplitude modulation, time-encoding, or the like), the detection signal may comprise corresponding analog voltage or current signal that has enough information to allows analyzer 308 to determine amplitudes and phases of based on the wavelengths and different paths taken by the sourced beams of radiation and subsequent scattered radiation. Additional detection signals (e.g., second, third, and so on) may be generated in a similar manner by additional detectors.

In some embodiments, amplifier 376 may amplify the detection signal. The detection signal may be received at frequency mixer 378. Frequency mixer 378 may adjust a frequency of the detection signal (e.g., frequency down-conversion).

In some embodiments, reference oscillator 370 may be housed in a dedicated enclosure (not shown). The enclosure may be a Faraday enclosure. AC mains power may enter the enclosure via a shielded AC power cord. A stand-alone power converter (not shown) may be mounted inside the enclosure of reference oscillator 370 to convert the power to a DC voltage suitable for the circuitry accompanying reference oscillator 370. Reference signal 316-$r$ may pass through amplifier 372 (e.g., a distribution amplifier), which amplifies and distributes reference signal 316-$r$ to various parts of the system, including components of the transmitter subsystem pictured in FIG. 2. Reference signal 316-$r$ may be distributed to, for example, local oscillator 346, and/or signal generator 382.

In some embodiments, the distribution amplifier 372 for reference oscillator 370 may be housed in a dedicated enclosure (not shown). The enclosure of amplifier 372 may be a Faraday enclosure. Reference signal 316-$r$ may enter the enclosure of amplifier 372 via, for example, a bulkhead-mounted SMA pass-through. AC mains power may be supplied by a shielded power cord, which may enter the enclosure via a shielded cable gland. Inside the enclosure of amplifier 372, a standalone power converter may convert the AC power to a suitable DC power for the operation of amplifier 372.

In some embodiments, local oscillator 346 may be a phase-locking element housed in a dedicated enclosure. The circuitry accompanying local oscillator 346 may be user-configured via a controlling PC via USB, which may enter the enclosure via a bulkhead-mounted USB pass-through. The controlling PC may also perform functions of analyzer 308. Local oscillator 346 may emit two substantially identical copies (a balanced pair, only one is shown) of local oscillator signals 316-$lo$ at frequency $f_{LO}$, for example, via surface-mounted SMA jacks. Local oscillator signals 316-$lo$ may be low-pass filtered to prevent subsequent gain stages (e.g., amplifier 348) from being saturated by unwanted amplification of higher-frequency odd harmonics in the waveform coming from phase-locking element 346. The local oscillator signals 316-$lo$ may exit the Faraday enclosure via, for example, bulkhead mounted SMA pass-throughs. Local oscillator signals 316-$lo$ may be carried by, for example, coaxial cables to each of two substantially identical amplifiers 348 (e.g., local oscillator distribution amplifiers, only one is shown in FIG. 3).

In some embodiments, a local oscillator distribution amplifier 348 may be housed in a dedicated Faraday enclosure (not shown). The local oscillator signal 316-$lo$ may enter the Faraday enclosure, for example, via a bulkhead mounted SMA jack. Inside the enclosure of 348, the local oscillator signal 316-$lo$ may pass through a 1×3 splitter (not shown); one of the outputs may be terminated into 50 Ohms, and each of the other two outputs may connect to one of two stand-alone low-noise amplifiers (not shown). The output of each amplifier may then be split using a 1×8 splitter (not shown). After splitting, for example, 16 identical amplified copies of local oscillator signal 316-$lo$ may exit the enclosure via, for example, bulkhead-mounted SMA jacks. The scenario described here is for generating 32 local oscillator signals 316-$lo$, 16 from each local oscillator distribution amplifier 348. This is provided as a non-limiting example of scalability. Each of the 32 local oscillator signals (16 from each distribution amplifier) may be transmitted via, for example, a coaxial cable to frequency mixer 378, where it is used to down-convert the detection signals (e.g., RF range) to intermediate frequencies, for example, in the audio spectrum. The distribution amplifiers 348 insert sufficient gain to ensure the local oscillator signals supply the full turn-on voltage of frequency mixer 378 in each of a plurality of detectors 424.

In some embodiments, signal digitizer 384 may be housed in a digitizer assembly. The digitizer assembly may comprise, for example, three substantially identical input interface devices (not shown). Each input interface may expose 16 analog input channels that present, for example, 10 kOhms of input impedance. The scenario described here is for operating 32 detectors 324. This is provided as a non-limiting example of scalability. Connections may be made via, for example, ¼-inch TRS audio jacks. The three input interfaces may be networked together using, for example, an Audio Video Bridging (AVB) switch. The three input interfaces may be synchronized by applying a 192-kHz square wave to a "WORD IN" port of each input interface. The 192-kHz square wave may be derived from the reference signal 316-$r$ using, for example, a frequency synthesizer 382.

In some embodiments, the input interfaces may be used to digitize up to 35 voltage time-series (more than enough inputs for 32 detectors). The inputs to signal digitizer 384 may be the adjusted, frequency down-converted detection signals from detector 324 (or a plurality of detectors 324), as well as the sync signal (i.e., sync signal 316-$ts$) emitted by the grandmother board assembly as was described previously in reference to FIG. 2.

In some embodiments, signal digitizer 384 may digitize the data streams synchronously across input channels. However, global phase offsets may occur across the different input interfaces because it is possible that each input interface may lock to the externally supplied word clock with a different phase. To solve this problem, digitizing the grandmother's sync signal on all input interfaces allows the digital signal processing to account for any phase offset across the three digitizers.

In some embodiments, the networked input interfaces may connect to the controlling PC via, for example, a single Thunderbolt connection. Software running on the PC may interact with the input interfaces using the software and drivers supplied by the manufacturer of the signal digitizer, as well as the Audio Stream Input/Output (ASIO) sound card driver protocol. The routing and configuration of the input interfaces may be set by a user of the PC. The interfaces may be configured to sample at, for example, 192 kS/s with a 4096-sample host buffer size. The sampling rate may be, for example in the range of approximately 0.2 kS/s to 400 kS/s.

Figure 4:
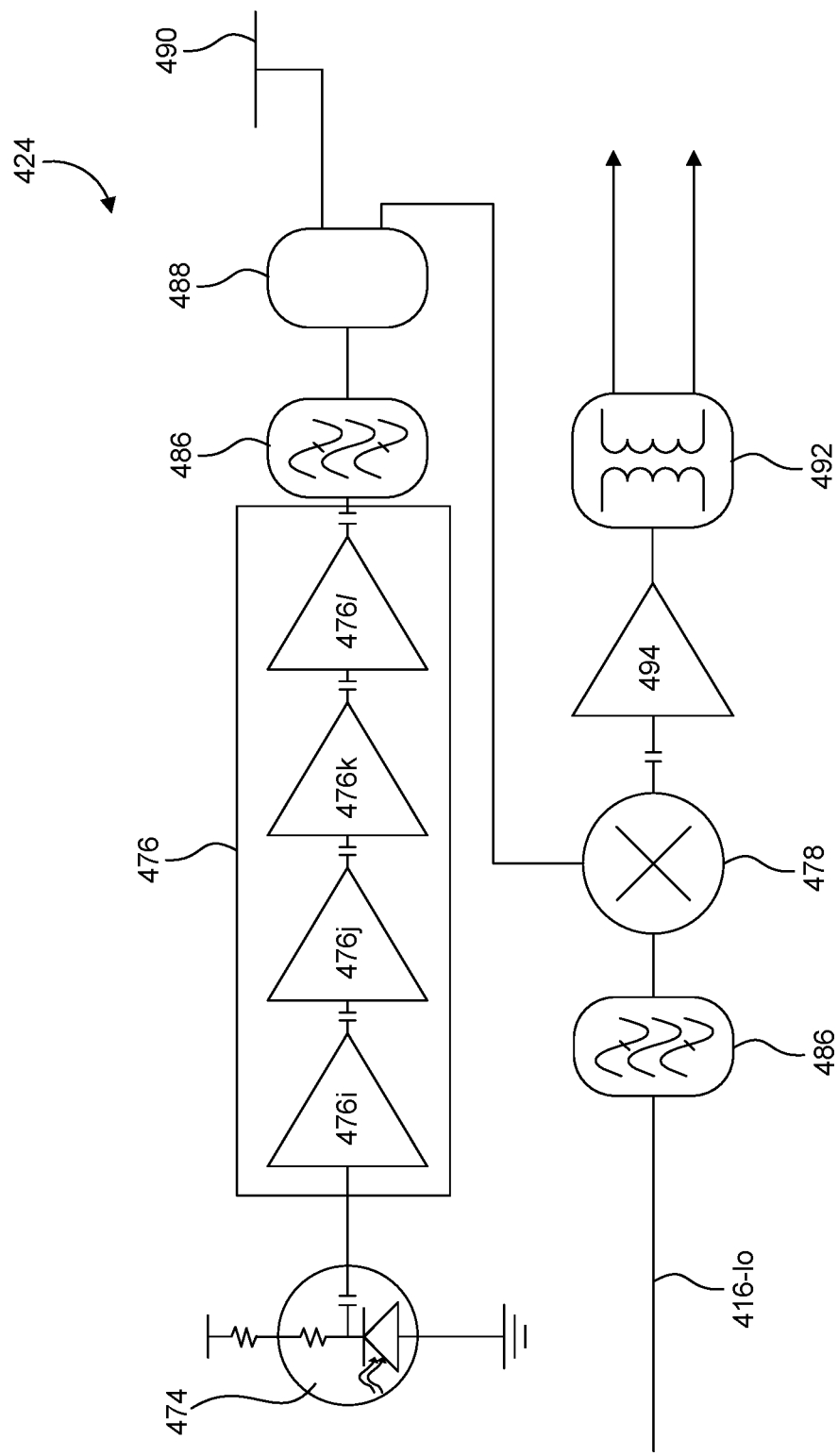

FIG. 4 shows a detector 424, according to some embodiments. In some embodiments, detector 424 may represent another view of detectors 124, 126, 128, and/or 324 (FIGS. 1 and 3), while highlighting additional details (as well as some elements of FIG. 2, for example local-oscillator signal elements). Unless otherwise noted, structures and functions described previously for elements of FIGS. 1, 2, and 3 can also apply to similarly numbered elements of FIG. 4 (e.g., reference numbers sharing the two right-most numeric digits). Consequently, certain structures and functions of elements of FIG. 4 should be apparent from descriptions of corresponding elements of FIGS. 1, 2, and 3, and thus some elements may not be reintroduced for brevity. Furthermore, the scalability described in reference to FIGS. 1, 2, and 3 will not be repeated again for brevity, but it should be appreciated that scalability applies to elements of FIG. 4 in a similar manner.

In some embodiments, the fast output from photo-sensitive element 474 (e.g., a detection signal from a SiPM) may be amplified using amplifier 476, which may comprise multiple gain blocks comprising amplifiers 476i, 476j, 476k, and/or 476l (the number of gain blocks shown is provided as a non-limiting example). Each amplifier stage may be followed by an in-series capacitor. Amplifier 476i may be configured as an inverting voltage amplifier (e.g., with a voltage gain of −620). Amplifier 476j may be configured as a non-inverting amplifier (e.g., with a voltage gain of 11). Amplifier 476k may be configured as an inverting voltage amplifier (e.g., with a voltage gain of −100). Amplifier 476l may comprise a low-noise amplifier (e.g., with a power gain of +22.4 dB). The gain values are provided here as non-limiting examples. Those skilled in the art will appreciate that other values may be suitable depending how system 100 (FIG. 1) is to be used and what gain and noise characteristics may be suitable for the intended application.

In some embodiments, the detection signal may be filtered using filter 486 (e.g. a band-pass filter). Filter 486 may restrict the operating bandwidth of detector 424. The restricted range may be, for example, approximately 190 MHz to 250 MHz (e.g., to prevent out-of-band interference from mixing to the intermediate-frequency (IF) band of interest). Detector 424 may further comprise an optional signal splitter 488 that routes to a test point 490 outside of detector 424 (e.g., to monitor the detection signal).

In some embodiments, a local oscillator signal 416-lo (e.g., from local oscillator 346) may enter the shielding enclosure of detector 424. The signal entry point may be, for example, an SMA pass-through on the enclosure bulkhead and may connect to the circuit board of detector 424 via, for example, a surface-mounted SMA jack. Local oscillator signal 416-lo may also be filtered using another filter 486 (may be same type of filter used after amplifier 476). Local oscillator signal 416-lo may be routed to a frequency mixer 478 (e.g., a surface-mounted double-balanced mixer).

In some embodiments, frequency mixer 478 may down-convert the RF signal to, for example, an audio spectrum (e.g., output an intermediate frequency signal). By converting into the audio spectrum, a conversion loss may be introduced (e.g., a conversion loss of approximately −5.6 dB). Detector 424 may further comprise a transformer 492 and an amplifier 494. Amplifier 494 may be configured as a non-inverting unity-gain amplifier for buffering the intermediate frequency signal from frequency mixer 478 and for driving the reactive load presented by transformer 492. Transformer 492 may provide galvanic isolation and balance the intermediate frequency signal. The balanced intermediate frequency signal may leave detector 424 via, for example, a surface-mounted 3.5-mm tip-ring-shield (TRS) audio jack. A shielded, twisted pair of conductors may carry the signal to a 3.5-mm TRS audio pass-through on the shielding enclosure bulkhead. Outside of detector 424, a 2-meter, shielded audio cable may transmit the signal to one of the analog inputs of a signal digitizer 384 (e.g., an audio digitizer).

Figure 5:
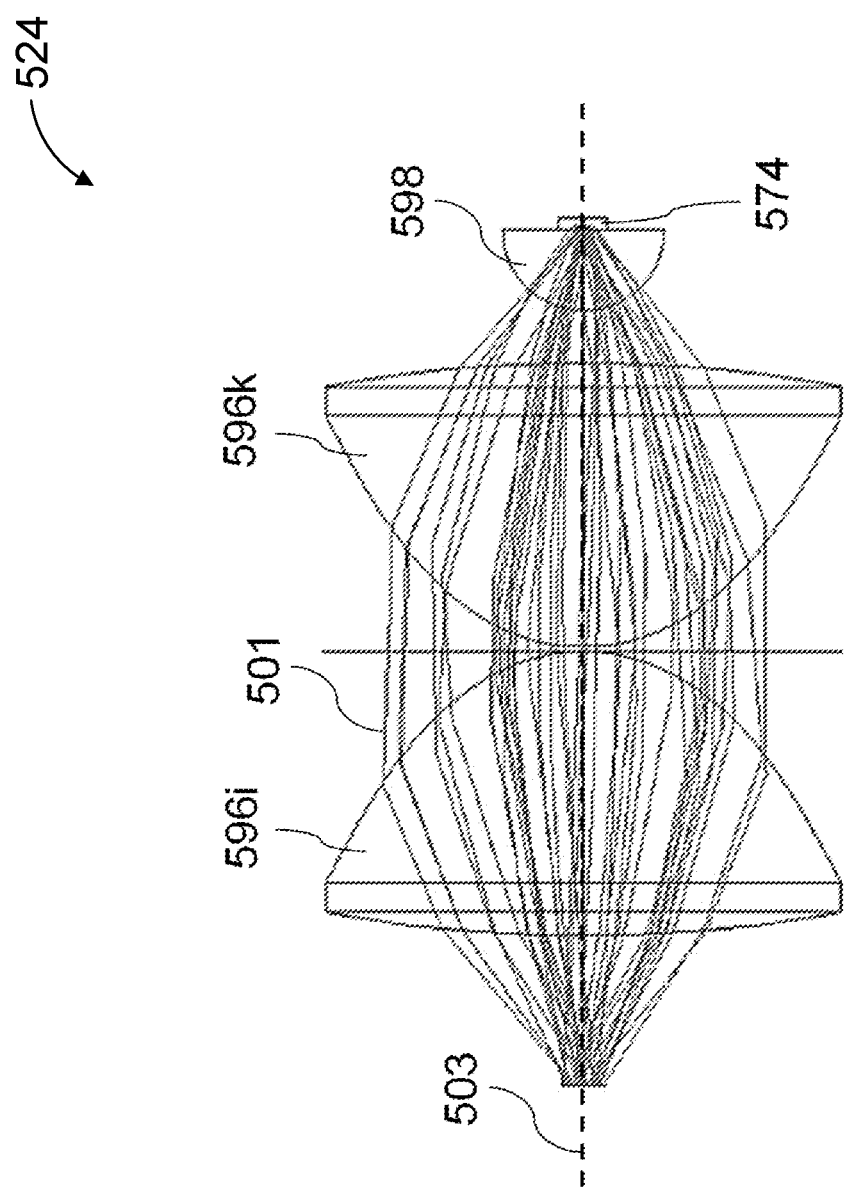
FIG. 5 shows a lens system used in a detector, according to some embodiments.

FIG. 5 shows a lens system used in a detector 524, according to some embodiments. In some embodiments, detector 524 may represent another view of detectors 124, 126, 128, 324, and/or 424 (FIGS. 1, 3, and 4), while highlighting additional details. Unless otherwise noted, structures and functions described previously for elements of FIGS. 1, 3, and 4 can also apply to similarly numbered elements of FIG. 5 (e.g., reference numbers sharing the two right-most numeric digits). Consequently, certain structures and functions of elements of FIG. 5 should be apparent from descriptions of corresponding elements of FIGS. 1, 3, and 4, and thus some elements may not be reintroduced for brevity.

In some embodiments, detector 524 may comprise a system or assembly of lenses and a photo-sensitive element 574. The system of lenses may comprise, for example, an aspheric lens 596i (e.g., a first aspheric lens), an aspheric lens 596k (e.g., a second aspheric lens), and a hemispherical lens 598. Optical fibers carrying scattered radiation from target 110 (FIG. 1) may thread into an SMA adapter and emit light (e.g., light rays 501) into the lens-system. The lens assembly is configured to improve optical coupling from the extended source presented by the optical fibers to photo-sensitive element 574. Photo-sensitive element 574 may have, for example, a square active area that is 1 mm by 1 mm. Aspherical lenses 596i and 596k may comprise aspheric condenser lenses. Hemispherical lens 598 may be an 8-mm-diameter half-ball lens. A cage rod assembly (not shown) may be used to position aspheric lenses 596i and 596k along an optical axis 503 (i.e., optical axes of the lenses are disposed along a common optical axis). Aspheric lens 596k may be disposed downstream of aspheric lens 596i. Hemispherical lens 598 may be disposed downstream of aspheric lenses 596i and 596k and upstream of photo-sensitive element 574. Aspheric sides of aspheric lenses 596i and 596k may be disposed so as to face one another in order to condense light rays 501.

In some embodiments, a printed circuit assembly (which supports photo-sensitive element 574 and the RF amplification chain and the down-mixing stage as discussed in reference to FIGS. 3 and 4) may be mounted to an XY-positioner (not shown) at the end of the cage rod assembly. The entire cage assembly may be bolted to a bulkhead of a shielding enclosure of detector 524. The cage rod assembly may be in electrical contact with the metal enclosure. The printed circuit may be electrically isolated from the cage. The hemispherical lens 598 may be adhered directly to the surface of photo-sensitive element 574 using UV-curable optical cement. The gaps between the lens and the printed circuit assembly may be filled in this manner. Alternatively, hemispherical lens 598 may be mounted using 5-minute epoxy (e.g., using a circular "moat" of epoxy around photo-sensitive element 574 with a drop of index-matching fluid between hemispherical lens 598 and the surface of photo-sensitive element 574). Centration of hemispherical lens 598 may be adjusted by hand before curing the adhesive.

In some embodiments, a Zemax model predicts the coupling efficiency of the lens assembly should approach 81.3% (−0.9 dB optical power). However, in practice a reasonably high coupling efficiency may be 71.2% (−1.47 dB optical power) due to the difficulty of precisely positioning the lenses along optical axis 503 during alignment and the lack of adjustment on centration of the aspheric lenses 596i and 596k.

Referring again to FIG. 3, in some embodiments, data analysis software (e.g., MATLAB) may be used at analyzer 308 (FIG. 3) to analyze the digitized signal from signal digitizer 384. Analyzer 308 may determine amplitude and/or phase information of portions 330, 332, 334, and/or 336 of the scattered radiation. Analyzer 308 may determine a change of a property of target 110 (FIG. 1) based on the analysis of the digitized signal. Analyzer 308 may generate image information of a tomographic image of target 110 (FIG. 1) based on the analysis of the digitized signal.

In some embodiments, the input interfaces of signal digitizer 384 may digitize the data using a bit depth of 24. The MATLAB software may write the incoming data streams to disk. The written data may take the form of, for example, Waveform Audio files (way files), one way file for each digitized channel, using single precision. In post processing, digital signal processing may be used to perform in-phase/quadrature-phase (I/Q) demodulation of the digitized time series generated by each detector 324. In general, one or more frequency analysis methods may be used. Some non-limiting examples of frequency analyses include I/Q demodulation, cosine transform, discrete cosine transform, Fourier transform, fast Fourier transform, or the like. Each has its strengths and drawbacks, for example, speed of calculations versus approximation and error. For example, if real-time results are sought (e.g., for capturing a time-evolution of target 110 (FIG. 1)), then using fast Fourier transformation may be appropriate.

To explain the processing steps, it may be instructive to work through a specific, non-limiting example for taking a FD-fNIRS measurement according to some embodiments of FIG. 1. Reference will also be made to FIGS. 2-5 when referring to parts not explicitly shown in FIG. 1, but would nonetheless be understood as being present in FIG. 1 based on the description above. For this non-limiting example, it will be assumed that 32 radiation sources (118, 120, 122, etc.) and 32 detectors (124, 126, 128, etc.) are present in system 100. For simplicity, the steps described here are specific to a time-encoding protocol where only one radiation source illuminates target 110 (e.g., a human head) at any given time (i.e., only one short-and-long-wavelength pair of lasers are keyed on at a time). It is also assumed that the time-encoding protocol may cycle through the radiation sources with a pattern repetition frequency (PRF) of 187.5 Hz. According to the Nyquist condition, a radiation source is thus keyed on frequently enough to sample hemodynamic activity occurring at frequencies bounded by 187.5 Hz/2=93.75 Hz, which may be more than sufficient to capture the blood-oxygen transient. The Nyquist condition may refer to a condition such that a sample rate that permits a discrete sequence of samples to capture all the information from a continuous-time signal of finite bandwidth. The disclosed non-limiting PRF value may be selected since it may allow an integer number of time-encoding pattern repetitions to fit within a single frame of 4096 samples when the digitizer is configured to use a sampling rate of 192 kS/s. Other PRF values may be chosen suitable for fulfilling other conditions.

Since one short-wavelength and one long-wavelength radiation source is keyed-on at a time, the modulation frequencies of the short-wavelength portions of the 32 radiation sources lasers may be chosen to be degenerate. The same may be applied to the long-wavelength portions of the 32 radiation sources. A result is that a user is free to use as few as three RF modulation frequencies for system 100 (i.e., one frequency for short wavelengths, one frequency for the long wavelengths, and one frequency for the local oscillator). This may greatly simplify the process of choosing modulation frequencies and configuring the phase-locking elements 246a/246b in illumination system 102 and local oscillator 346 in the receiver system of FIG. 3. For this example, phase-locking elements for short wavelengths are configured to modulate at 211.0230625 MHz, while long wavelengths are modulated at 211.0500625 MHz. The local oscillator may use 211.0000000 MHz. In some embodiments, the selected modulation frequencies may correspond to relatively spur-free behavior of the phase-locking elements, leading to a nearly monochromatic modulation spectrum for each radiation source.

In some embodiments, the electrical output of each photosensitive element 374, 474, or 574 in detection system 104 may contain components ringing at 211.0230625 MHz and 211.0500625 MHz, where the radiation sources responsible for generating these components are sequentially incrementing in time per the selected time-encoding pattern.

In some embodiments, frequency mixers 378 or 478 in detection system 104 down-convert the RF signals to the audio spectrum, with central frequencies of 23.0625 kHz and 50.0625 kHz. It is convenient that sinusoidal signals of these frequencies may contain an integer number of periods within a single digitized frame of 4096 samples when using a sampling rate of 192 kS/s. Since the grandmother assembly on-off-keys the signals in time with a square wave, the power spectrum for a single short-wavelength or long-wavelength signal may be a frequency comb, with a central frequency of 23.0625 kHz or 50.0625 kHz, respectively, and a comb-line spacing equal to the time-encoding pattern repetition frequency of 187.5 Hz. The square wave modulation provided by 216-$t$ may result in a power spectrum having a sinc-squared envelope, the width of which may be determined by the duty cycle of the square wave. The audio frequencies highlighted here are selected, as a non-limiting example, to ensure the central frequencies and the spectral mesh boundaries in Fourier space (i.e., 0 Hz and 192 kHz/2=96 kHz) are widely spaced for preventing spectral overlap of the frequency combs and preventing contamination due to spectral leakage. Another reason for selecting the specific example of audio frequencies may be to ensure the highest frequency of interest is sampled often enough (192 kS/s) to satisfy the Nyquist condition, at least approximately.

In some embodiments, post-processing may be performed by analyzer 108 or 308. Analyzer 108 or 308 and controller 106 or 206 may share hardware, for example, a controlling PC loaded with MATLAB analysis software. In some embodiments, a non-transitory computer readable medium may comprise instructions stored thereon, that, when executed on a computing device of system 100, cause the computing device (or system 100, or a device in system 100, whichever the case may be) to perform operations. The operations may be operations as shown in FIG. 6.

Figure 6:
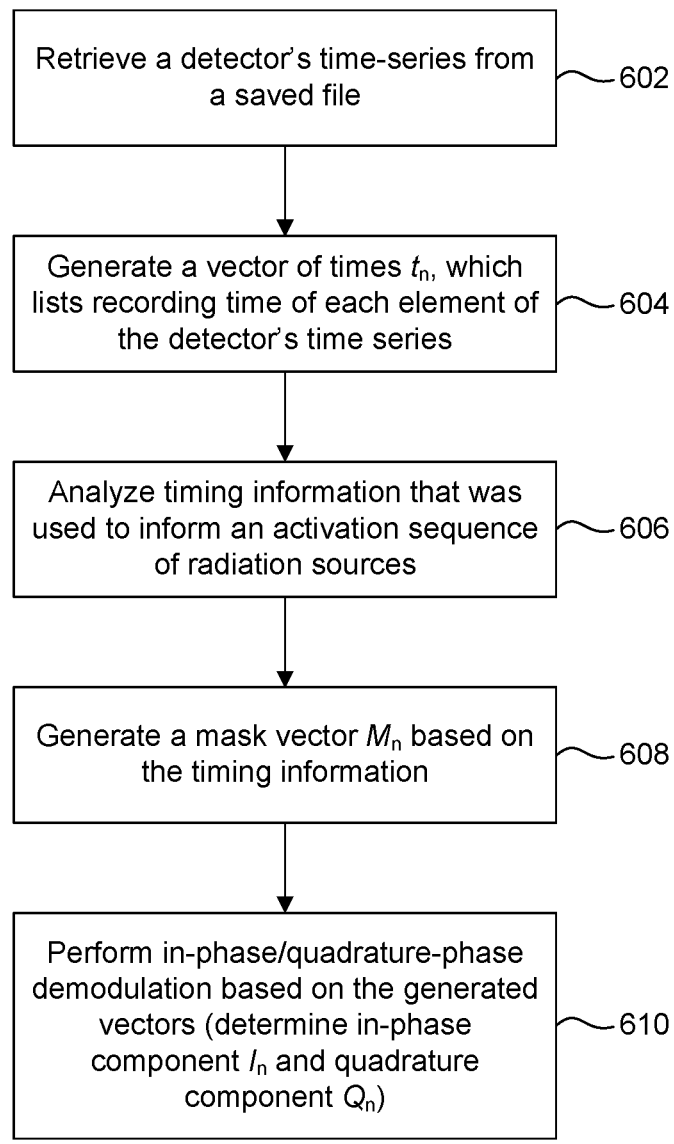
FIG. 6 shows a flowchart for a method, according to some embodiments.

FIG. 6 shows a method 600 for performing post-processing analysis in conjunction with a spectroscopy measurement, according to some embodiments. The operations described with reference to example method 600 can be performed by, or according to, any of the systems, apparatuses, components, techniques, or combinations thereof described herein, such as those described with reference to FIGS. 1-5 above and FIG. 7 below At step 602, a computing device may obtain a detector's time-series (e.g., intensity evolution of a digitized signal from a detector). The time series may be obtained in real-time from a measurement or retrieved from a saved file (e.g., a way file) after a measurement. The discrete time-series may be denoted as $V_n$.

At step 604, the computing device may generate a vector of times $t_n$, which lists a recording time of each element of $V_n$.

At step 606, the computing device may analyze the timing information (e.g., based on sync signal 316-$ts$, which informs an activations sequence of radiation sources). The timing information may be obtained real-time during a measurement or from a saved file after the measurement.

At step 608, the computing device may generate a mask vector $M_n$ based on the timing information. Non-zero elements of mask vector $M_n$ may correspond to radiation sources that are in the "on" state. The mask vector may be a simple square wave, for example, 1 for radiation on, else 0. Alternatively, the mask vector may be a train of confined Gaussian pulses. It should be appreciated that the mask vector may take another suitable form for non-time-encoding techniques.

In some embodiments, at step 610, the computing device may perform I/Q demodulation based on the generated vectors. For example, the computing device may perform element-wise multiplication (represented here by the .* operator) to compute the baseband in-phase component $I_n$ and quadrature component $Q_n$, with respect to a synthetic sine wave whose frequency $v_{1F}$ is the down-converted intermediate frequency based on the modulation frequencies of the radiation sources (in this example, $v_{1F}$ may be 23.0625 kHz for the short wavelength sources or 50.0625 kHz for the long wavelength sources). The multiplication may be performed as given by Eqs. 1 and 2:

$$I_n = V_{n'} .* M_{n'} .* \cos(2\pi v_{1F} t_n) \qquad \text{Eq. 1.}$$

$$Q_n = V_{n'} .* M_{n'} .* \sin(2\pi v_{1F} t_n) \qquad \text{Eq. 2.}$$

In some embodiments, the computing device performing I/Q demodulation analysis may decimate $I_n$ and $Q_n$ to a suitable detection bandwidth (for example, 1 Hz) by applying an anti-aliasing low-pass filter. A filter may comprise, for example, an $8^{th}$ order Chebyshev low-pass filter to produce down-sampled versions of $I_n$ and $Q_n$. The down-sampled versions may be labeled $I_m$ and $Q_m$, respectively. The computing device may then compute the baseband amplitude and phase, $R_m$ and $\phi_m$ using Eqs. 3 and 4:

$$R_m = \sqrt{I_m^2 + Q_m^2} \qquad \text{Eq. 3.}$$

$$\phi_m = \arctan(I_m/Q_m) \qquad \text{Eq. 4.}$$

In some embodiments, the computing device performing the I/Q demodulation may linearize and scale the amplitude using a calibration curve that is derived from performing calibration measurements on detection system 104 (FIG. 1). Since discrete detectors may not behave identical to one another (e.g., one source signal presented to two detectors, but the detectors providing different responses), a calibration measurement may be performed for normalizing the measurement results according to a common baseline.

In some embodiments, the method steps may be iterated for each source-detector pair to generate 2048 (32×2×32) baseband amplitudes and 2048 baseband phases. Furthermore, this approach, or other related transform approaches (e.g., fast Fourier transform), may be adapted to demodulate and down-sample the signals in real time.

The method steps of FIG. 6 may be performed in any conceivable order and it is not required that all steps be performed. Moreover, the method steps of FIG. 6 described above merely reflect an example of steps based on the functions disclosed in embodiments herein. That is, the method is not limited to only those steps explicitly shown in FIG. 6. It should be appreciated that further method steps and functions are envisaged based on functions described in reference to embodiments herein.

Figure 7:
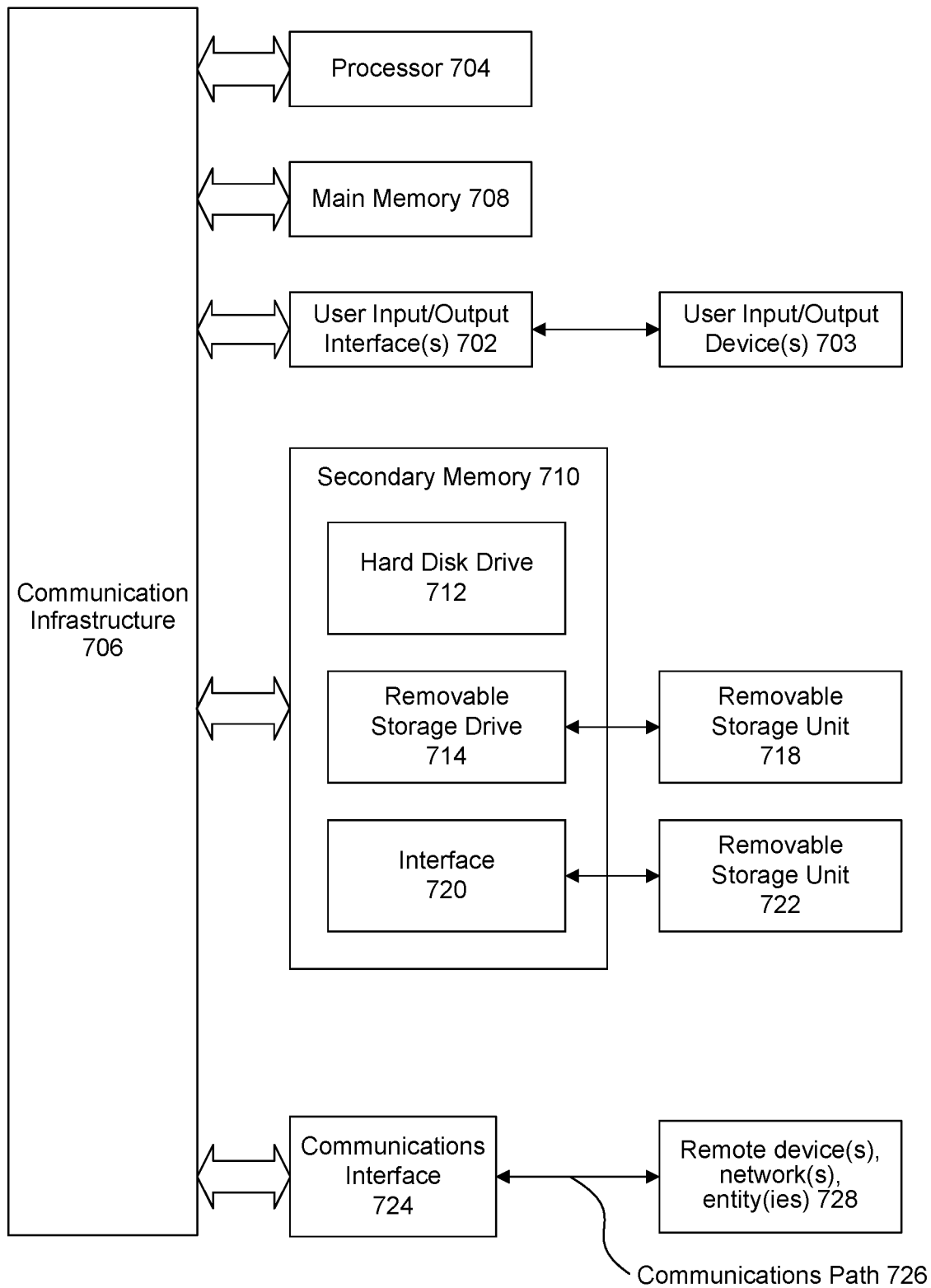
FIG. 7 shows a computer system for implementing various embodiments of this disclosure.

FIG. 7 shows a computer system 700, according to some embodiments. Various embodiments and components therein can be implemented, for example, using computer system 700 or any other well-known computer systems. For example, the method steps of FIG. 6 may be implemented via computer system 700.

In some embodiments, computer system 700 may comprise one or more processors (also called central processing units, or CPUs), such as a processor 704. Processor 704 may be connected to a communication infrastructure or bus 706.

In some embodiments, one or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

In some embodiments, computer system 700 may further comprise user input/output device(s) 703, such as monitors, keyboards, pointing devices, etc., that communicate with communication infrastructure 706 through user input/output interface(s) 702. Computer system 700 may further comprise a main or primary memory 708, such as random access memory (RAM). Main memory 708 may comprise one or more levels of cache. Main memory 708 has stored therein control logic (i.e., computer software) and/or data.

In some embodiments, computer system 700 may further comprise one or more secondary storage devices or memory 710. Secondary memory 710 may comprise, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive. Removable storage drive 714 may interact with a removable storage unit 718. Removable storage unit 718 may comprise a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

In some embodiments, secondary memory 710 may comprise other means, instrumentalities or other approaches for allowing computer programs and/or other instructions and/or data to be accessed by computer system 700. Such means, instrumentalities or other approaches may comprise, for example, a removable storage unit 722 and an interface 720. Examples of the removable storage unit 722 and the interface 720 may comprise a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some embodiments, computer system 700 may further comprise a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may comprise any combination of LANs, WANs, the Internet, etc. Control logic and/or data may be transmitted to and from computer system 700 via communications path 726.

In some embodiments, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to those skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A system comprising:
    first and second radiation sources configured to generate respective first and second beams of radiation to irradiate a target along respective first and second paths, each of the first and second beams comprising:
        a first wavelength at a first modulation frequency; and
        a second wavelength at a second modulation frequency;
    first and second detectors each comprising:
        a photo-sensitive element configured to receive scattered radiation resulting from the first and second beams and to generate first or second detection signals respective to the first or second detectors based on the received scattered radiation;
        a Faraday shielding enclosure;
        a signal amplifier configured to amplify the first or second detection signals; and
        a frequency mixer configured to frequency-adjust the first or second detection signals;
    a signal digitizer configured to receive the first and second detection signals after the frequency-adjusting to generate a digitized signal;
    a controller configured to provide timing information to the first and second radiation sources to inform an activation scheme of the first and second radiation sources and corresponding radiation detection events at the first and second detectors; and
    an analyzer configured to analyze the digitized signal and the timing information to determine at least amplitude and phase information of the scattered radiation.

2. The system of claim 1, wherein the first and second detectors each further comprise a lens system comprising:
    a first aspheric lens having an optical axis along with a common optical axis;
    a second aspheric lens disposed downstream of the first aspheric lens and having an optical axis that is along the common optical axis; and
    a hemispherical lens disposed downstream of the first aspheric lens and upstream of the photo-sensitive element of the first or second detector and having an optical axis along the common optical axis.

3. The system of claim 1, wherein the photo-sensitive elements of the first and second detectors each comprise a silicon photomultiplier.

4. The system of claim 1, wherein the signal digitizer comprises an audio digitizer.

5. The system of claim 4, wherein:
    the frequency-adjusted first and/or second detection signals comprise audio frequencies based on the audio digitizer performing the frequency-adjusting; and
    the audio digitizer is configured to digitize the frequency-adjusted first and/or second detection signals having the audio frequencies.

6. The system of claim 1, wherein a sampling rate of the signal digitizer is in a range of approximately 0.2 kS/s to 400 kS/s.

7. The system of claim 1, wherein the analyzer is further configured to determine a change of a property of the target based on the analyzing the digitized signal.

8. The system of claim 7, wherein:
    the property is a blood-oxygen metric of the target; and
    the analyzer is further configured to determine a change the blood-oxygen metric based on the analyzing the digitized signal.

9. The system of claim 1, wherein the analyzer is further configured to generate image information of a tomographic image of the target based on the analyzing the digitized signal.

10. The system of claim 1, wherein the first and second frequencies are independently controllable.

11. The system of claim 1, wherein the first and second frequencies are RF frequencies.

12. The system of claim 9, wherein the first and second frequencies are in a range of approximately 70 to 500 MHz.

13. The system of claim 1, wherein the first and second radiation sources each comprises:
    first and second phase-locking elements configured to generate, based on the timing information, respective first and second modulation signals comprising, respectively, the first and second modulation frequencies;

first and second light-emitting elements configured to respectively receive the first and second modulation signals so as to respectively generate the first wavelength at the first modulation frequency and the second wavelength at the second modulation frequency;

a radiofrequency-shielding enclosure.

14. The system of claim 1, wherein:

the controller comprises a local oscillator and a Faraday shielding enclosure; and the timing information is based on a reference signal from the local oscillator.

15. The system of claim 1, wherein:

the timing information comprises time-encoding information and the activation scheme comprises sequential activation of the first and second radiation sources; and/or the timing information comprises partial intensity activation information and the activation scheme comprises overlapping activation of the first and second radiation sources using amplitude modulation.

16. The system of claim 1, wherein the first and second detectors each further comprise:

a band-pass filter configured to filter the first or second detection signals; and a transformer configured to provide galvanic isolation of the first or second detection signals.

17. The system of claim 1, wherein the analyzer is configured to perform the analyzing using in-phase/quadrature-phase demodulation to provide a snapshot measurement of the target.

18. The system of claim 1, wherein the analyzer is configured to perform the analyzing using fast Fourier transform to provide a real-time measurement of the target.

19. The system of claim 1, wherein the photo-sensitive element of each of the first and second detectors comprises a monochromatic detection element.

20. The system of claim 1, further comprising:

a third radiation source configured to generate a third beam of radiation to irradiate a target along the first path, and wherein the controller is configured to provide the timing information to inform the first, second, and third radiation sources to key-on sequentially.

* * * * *